US009880862B2

(12) United States Patent
Forristal (10) Patent No.: US 9,880,862 B2
(45) Date of Patent: Jan. 30, 2018

(54) METHOD AND SYSTEM FOR VERIFYING PROPER OPERATION OF A COMPUTING DEVICE AFTER A SYSTEM CHANGE (75) Inventor: Jeff B. Forristal, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 249 days.

(21) Appl. No.: 13/997,717

(22) PCT Filed: Mar. 31, 2012

(86) PCT No.: PCT/US2012/031761
§ 371 (c)(1),
(2), (4) Date: Oct. 10, 2014

(87) PCT Pub. No.: WO2013/147915
PCT Pub. Date: Oct. 3, 2013

(65) Prior Publication Data
US 2015/0067311 A1  Mar. 5, 2015

(51) Int. Cl.
*G06F 9/44* (2006.01)
*G06F 9/445* (2006.01)
*G06F 11/14* (2006.01)

(52) U.S. Cl.
CPC ........ *G06F 9/44505* (2013.01); *G06F 9/4401* (2013.01); *G06F 9/4403* (2013.01); *G06F 11/1433* (2013.01); *G06F 11/1417* (2013.01)

(58) Field of Classification Search
CPC ...... G06F 21/57; G06F 11/1417; G06F 21/56; G06F 8/65; G06F 11/1433; G06F 21/572; G06F 21/577; G06F 9/4401
USPC .......................................................... 713/2
See application file for complete search history.

(56) References Cited

U.S. PATENT DOCUMENTS

| 7,149,978 B1 | 12/2006 | Maffezzoni |
| 7,318,089 B1 * | 1/2008 | Stachura ............. H04L 41/0672 709/220 |
| 2003/0204709 A1 * | 10/2003 | Rich ..................... G06F 15/177 713/1 |
| 2004/0030877 A1 | 2/2004 | Frid |
| 2004/0076043 A1 | 4/2004 | Boals et al. |

(Continued)

FOREIGN PATENT DOCUMENTS

| CN | 101038564 A | 9/2007 |
| CN | 101587456 A | 11/2009 |

(Continued)

OTHER PUBLICATIONS

Australian Patent Examination Report dated May 15, 2015 in connection with Australian Patent Application No. 2012375273, 3 pages.

(Continued)

*Primary Examiner* — Thomas Lee
*Assistant Examiner* — Santosh R Poudel
(74) *Attorney, Agent, or Firm* — Barnes & Thornburg LLP (57) ABSTRACT A method and system for applying a system change in an automated fashion and verifying the correct operation of a computing device after the system change includes allowing the computing device an opportunity to at least temporarily apply the system change, determine whether the system change is successful, and discard the system change if not successful, using operating system and BIOS components.

19 Claims, 5 Drawing Sheets

(56) References Cited

U.S. PATENT DOCUMENTS

| | | | |
|---|---|---|---|
| 2005/0132351 A1* | 6/2005 | Randall | G06F 11/1433 717/168 |
| 2005/0216753 A1 | 9/2005 | Dailey et al. | |
| 2005/0278518 A1 | 12/2005 | Ko et al. | |
| 2006/0143431 A1 | 6/2006 | Rothman et al. | |
| 2008/0046710 A1* | 2/2008 | Maddocks | G06F 8/67 713/2 |
| 2008/0155331 A1* | 6/2008 | Rothman | G06F 11/1417 714/36 |
| 2010/0100972 A1* | 4/2010 | Lemieux | G06F 21/57 726/34 |
| 2010/0199078 A1 | 8/2010 | Shih et al. | |
| 2012/0124361 A1* | 5/2012 | Mulcahy | G06F 9/44505 713/2 |
| 2013/0086571 A1* | 4/2013 | Dasari | G06F 8/665 717/168 |
| 2013/0262849 A1* | 10/2013 | Redheendran | G06F 8/665 713/100 |

FOREIGN PATENT DOCUMENTS

| | | |
|---|---|---|
| JP | 2003-316582 A | 11/2003 |
| JP | 2004-318838 A | 11/2004 |
| JP | 2006-039660 A | 2/2006 |
| JP | 2010-160558 A | 7/2010 |
| WO | 2013147915 A1 | 10/2013 |

OTHER PUBLICATIONS

First Preliminary Rejection issued in connection with Korean Patent Application No. 10-2014-7026221, 3 pages.

International Search Report and Written Opinion received for PCT Application No. PCT/US2012/031761, dated Nov. 9, 2012, 10 pages.

"BIOS," Wikipedia, the Free Encyclopedia, available: [http://en.wikipedia.org/w/index.php?title=BIOS&oldid=451843801], edited Sep. 22, 2011, 9 pages.

European Search Report for Patent Application No. 12872476.2-1954/2831722, dated Aug. 27, 2015.

Anonymous, "Award BIOS Setup Program," Jan. 18, 2001, retrieved from the internet: URL:http://www.elhvb.com/mobokive/archive/chaintech/manuals/7aja2/vo.2/uaja2-3.pdf, retrieved on Jun. 17, 2011.

Notice of Reasons for Rejection and English Translation for Japanese Patent Application No. 2015-503177, dated Jan. 5, 2016, 6 pages.

Notice of Reasons for Rejection and English Translation for Japanese Patent Application No. 2015-503177, dated Jul. 26, 2016, 5 pages.

Chinese Office Action and English Translation for Patent Application No. 201280072107.6, dated Apr. 12, 2017, 23 pages.

European Search Report for Patent Application No. 12872476.2-1954, dated Apr. 4, 2017, 5 pages.

\* cited by examiner

METHOD AND SYSTEM FOR VERIFYING PROPER OPERATION OF A COMPUTING DEVICE AFTER A SYSTEM CHANGE

BACKGROUND

From time to time, computing devices may require system-level changes to maintain proper and/or efficient operation. Examples of such changes may include changes to the BIOS, patches for the processor microcode, firmware updates, security patches, configuration changes, and/or others. However, implementing a system change may cause the computing device to enter an inoperable state. As a result, performing a system-level change in an automated (e.g., unattended) fashion can be risky. In fact, if a computing device receives a request for an automated system change, the request may be ignored or denied so as not to risk a system failure, despite the potential benefits of installing the system change.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present disclosure. It will be appreciated, however, by one skilled in the art that embodiments of the disclosure may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention implemented in a computer system may include one or more bus-based interconnects between components and/or one or more point-to-point interconnects between components. Embodiments of the invention may also be implemented as instructions carried by or stored on a transitory or non-transitory machine-readable medium, which may be read and executed by one or more processors. A machine-readable medium may be embodied as any device, mechanism or physical structure for storing or transmitting information in a form readable by a machine (e.g., a computing device). For example, a machine-readable medium may be embodied as read only memory (ROM); random access memory (RAM); magnetic disk storage media; optical storage media; flash memory devices; mini- or micro-SD cards, memory sticks, electrical signals, and others.

In the drawings, specific arrangements or orderings of schematic elements, such as those representing devices, modules, instruction blocks and data elements, may be shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

In general, schematic elements used to represent instruction blocks may be implemented using any suitable form of machine-readable instruction, such as software or firmware applications, programs, functions, modules, routines, processes, procedures, plug-ins, applets, widgets, code fragments and/or others, and that each such instruction may be implemented using any suitable programming language, library, application programming interface (API), and/or other software development tools. For example, some embodiments may be implemented using machine-level instructions, C, C++, and/or other programming languages.

Similarly, schematic elements used to represent data or information may be implemented using any suitable electronic arrangement or structure, such as a register, data store, table, record, array, index, hash, map, tree, list, graph, file (of any file type), folder, directory, database, and/or others.

Further, in the drawings, where connecting elements, such as solid or dashed lines or arrows, are used to illustrate a connection, relationship or association between or among two or more other schematic elements, the absence of any such connecting elements is not meant to imply that no connection, relationship or association can exist. In other words, some connections, relationships or associations between elements may not be shown in the drawings so as not to obscure the disclosure. Also, for ease of illustration, a single connecting element may be used to represent multiple connections, relationships or associations between elements. For example, where a connecting element represents a communication of signals, data or instructions, it should be understood by those skilled in the art that such element may represent one or multiple signal paths (e.g., a bus), as may be needed, to effect the communication.

Figure 1:
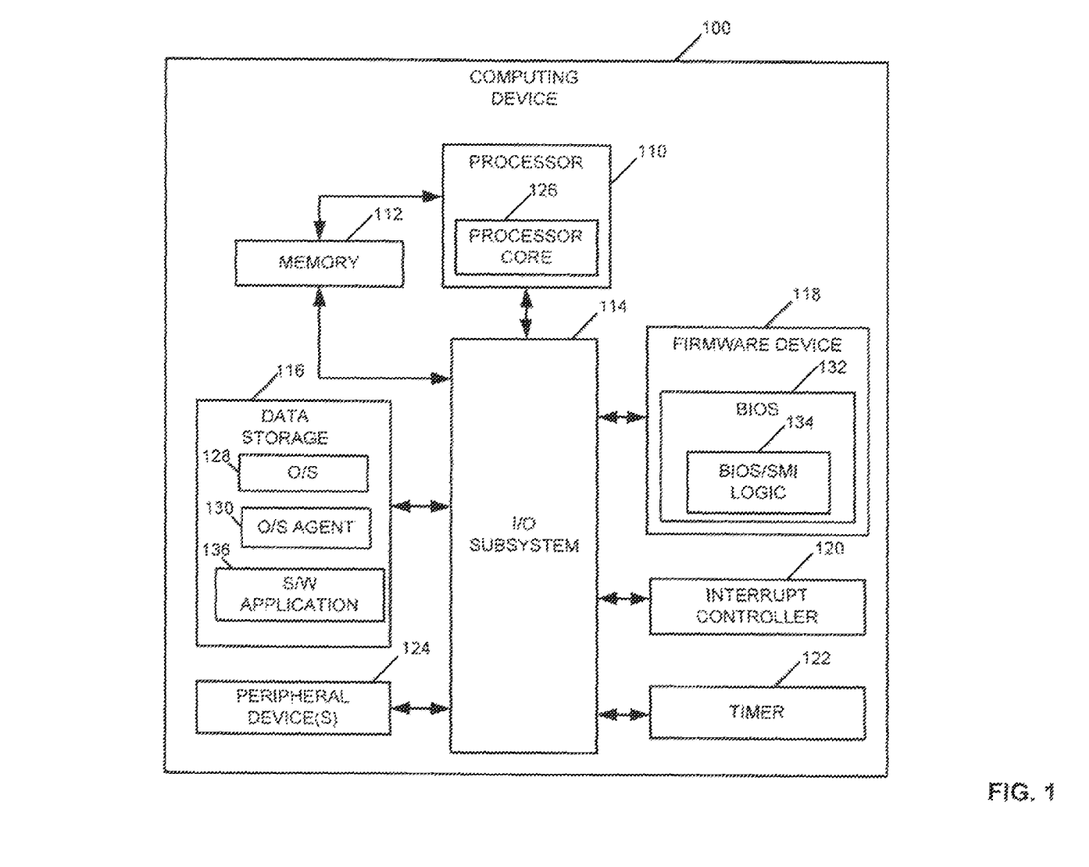
FIG. 1 is a simplified block diagram of at least one embodiment of a computing device.

Referring now to FIG. 1, an illustrative system for verifying the proper operation of a computing device 100 after the implementation of a system change is embodied as an O/S agent 130 and BIOS/SMI logic 134. As described in detail below, the O/S agent 130 communicates with the BIOS/SMI logic 134 to allow a system change to be installed, at least temporarily, on the computing device 100 in an automated fashion (e.g., without human intervention). If the installation of the system change is unsuccessful, the O/S agent 130 and BIOS/SMI logic 134 allow the operating system 128 to safely return to its previous (pre-system change) configuration. In this way, system-level changes can be implemented in an automated fashion with a reduced risk of system failure.

The computing device 100 may be embodied as any type of electronic device, which may include, without limitation, a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or any combination of any of the foregoing. The illustrative computing device 100 includes at least one processor 110 communicatively coupled to at least one memory 112 and an input/output (I/O) subsystem 114. The computing device 100 may be embodied as any type of computing device such as, for example, a desktop computer, a laptop or tablet computer, a server, an enterprise computer system, a network of computers, a mobile or handheld computing device, or other electronic device (of any size form factor) having computing capabilities, depending on the particular application.

The illustrative processor 110 includes at least one processor core 126. In addition to an amount of cache memory, the memory 112 may be embodied as any type of suitable memory device, such as a dynamic random access memory device (DRAM), synchronous dynamic random access memory device (SDRAM), double-data rate dynamic random access memory device (DDR SDRAM), and/or other volatile memory device.

In some embodiments, the I/O subsystem 114 may include a memory controller (e.g., a memory controller subsystem or northbridge) and/or an input/output controller (e.g., an input/output controller or subsystem or southbridge) (not shown). In other embodiments, I/O subsystems having other configurations may be used. For example, in some embodiments, the I/O subsystem 114 may form a portion of a system-on-a-chip (SoC) and be incorporated, along with the processor 110 and other components of the computing device 100, on a single integrated circuit chip. As such, it will be appreciated that each component of the I/O subsystem 114 may be located on a common integrated circuit chip in some embodiments.

The illustrative I/O subsystem 114 is communicatively coupled to the memory 112, at least one data storage device 116, at least one firmware device 118, an interrupt controller 120, a timer 122, and, optionally, one or more peripheral device(s) 124. Portions of the data storage device 116 may be embodied as any suitable device for storing data and/or computer instructions, such as disk storage (e.g. hard disks), a network of physical and/or logical storage devices, and/or others. In the illustrative embodiment, an operating system (O/S) 128, the O/S agent 130, and one or more software application(s) 136 reside in the data storage 116. The operating system 128 may be, for example, a MICROSOFT WINDOWS, LINUX, APPLE IOS or other operating system, or other similar set of instructions, which may be designed specifically for a certain type of computing device, such as discrete, handheld, or portable electronic devices in some embodiments. The foregoing exemplary operating systems are or may be registered or unregistered trademarks of their respective owners. The software application(s) 136 may be arbitrary, e.g., any software application that is capable of running on the computing device 100, or which may be designed specifically for a certain type of computing device, such as a discrete, handheld, or portable electronic device, in some embodiments. Portions of the operating system 128, the O/S agent 130, and/or the software application(s) 136 may be copied to the memory 112 during operation, for faster processing or for other reasons.

Figure 2:
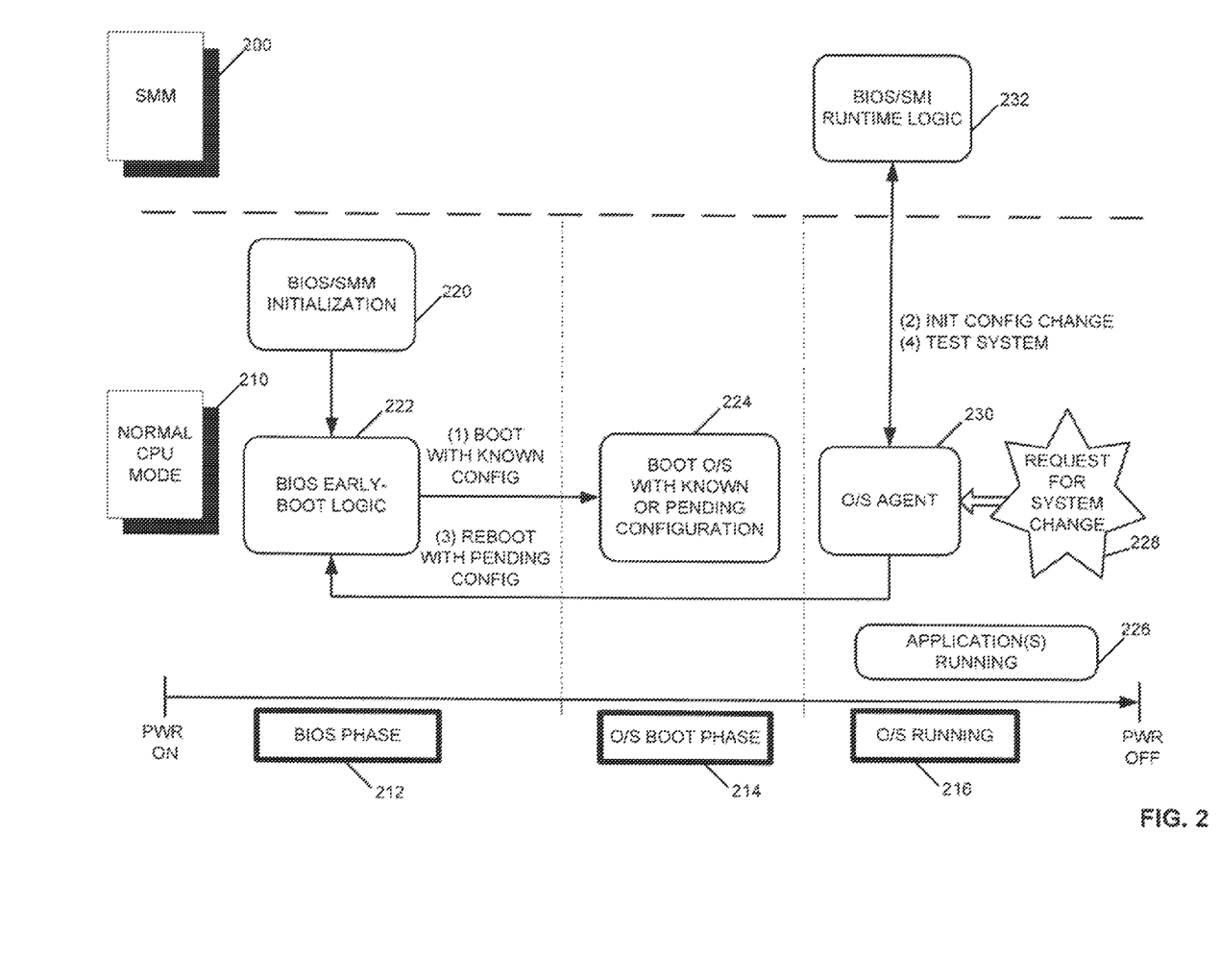
FIG. 2 is a simplified module diagram of at least one embodiment of phases of operation and operating modes of the computing device of FIG. 1.

The illustrative firmware device 118 is embodied as a non-volatile memory or read-only memory (ROM) device such as flash memory. In the illustrative embodiments, the firmware device 118 stores the set of routines commonly known as the Basic Input/Output System (BIOS) 132, which includes the BIOS/SMI logic 134, data, instructions, and/or other information. The BIOS/SMI logic 134 includes the BIOS early-boot logic 222 and the BIOS/SMI runtime logic 232, which are shown in FIG. 2 and described below.

The illustrative BIOS 132 enables the computing device 100 to start the operating system 128 and to communicate with the various other device(s) that are coupled to the I/O subsystem 114. Depending upon the particular processor architecture, a Unified Extensible Firmware Interface (UEFI) or other instructions may be used in place of the BIOS; however, for ease of description the term BIOS may be used herein to refer more generally to the BIOS, the UEFI, or any similar such mechanism. During operation, portions of the BIOS 132 and/or BIOS/SMI logic 134 may be copied to the memory 112, for faster execution or other reasons.

While shown separately for ease of illustration, each or either of the interrupt controller 120 and/or the timer 122 may be embodied in the I/O subsystem 114, the firmware 118, and/or the processor 110, in various embodiments. The interrupt controller 120 and the timer 122 are configured to facilitate communications between the O/S agent 130 and the BIOS/SMI logic 134 and to allow some functions or processing to be performed in a special-purpose operating mode. In some computing environments, the special-purpose operating mode is known as the System Management Mode (SMM), and that term may be used herein to refer to such special-purpose operating modes more generally. The SMM may be used to handle system-wide functions, such as, for example, power management, hardware control, and/or error handling.

Generally speaking, the SMM is a platform service that is typically hidden from operating system 128. Use of the system management mode may be initiated by the generation of a management interrupt event such as a system management interrupt (SMI) or a platform management interrupt (PMI) depending upon the particular processor architecture. These interrupt events are usually non-maskable and thus take precedence over maskable interrupts and other events. Typically, the management interrupt initiates an asynchronous process that runs concurrently with any operating system processes that may be executing. As described below, the illustrative interrupt controller 120 generates management interrupts (such as SMIs or PMIs) in response to the occurrence of certain events. The illustrative timer 122 can be enabled to count down a determined or programmable period of time (e.g., in the range of about 5 minutes), such that expiration of the period of time initiates a management interrupt.

The I/O subsystem 114 may be communicatively coupled to one or more other peripheral device(s) 124, such as a network interface, graphics driver, audio driver, and/or others (not shown), depending upon, for example, the intended use of the computing device 100. Further, it should be appreciated that the computing device 100 may include other components, sub-components, and devices not illustrated in FIG. 1 for clarity of the description.

In general, the components of the computing device 100 are communicatively coupled as shown in FIG. 1, by one or more signal paths, which are represented schematically as double-headed arrows. Such signal paths may be embodied as any type of wired or wireless signal paths capable of facilitating communication between the respective devices. For example, the signal paths may be embodied as any number of wires, printed circuit board traces, via, bus, point-to-point interconnects, intervening devices, and/or the like.

In operation, the operating system 128 may receive a request, to implement a system-level change at any time after it starts running on the computing device 100 (e.g., at runtime). Such a request may relate to, e.g., a software or firmware update, a patch to central processing unit (CPU) or processor microcode, a change to the BIOS, a security patch, and/or a configuration change. For ease of discussion, each, any or all of such changes and/or updates, or combinations thereof, may be referred to herein as a "system change," and a system configuration that includes one or more system changes may be referred to as a "pending configuration."

As an example, in some cases, when the processor 110, operating system 128 or software application 136 starts operating, it may automatically check (e.g., by going to an Internet web site or remote server) to see if there is a system change that has not yet been installed on the computing device 100. If there is a system change available to be installed on the computing device 100, the O/S agent 130 communicates with the BIOS/SMI logic 134 to attempt a one-time "trial" boot of the operating system 128 with the pending system change. If the O/S agent 130 determines that the trial boot has failed, the operating system 128 reboots with its previous configuration (e.g., without the system change).

Referring now to FIG. 2, a module diagram illustrates phases of operation of the computing device 100 that occur after the computing device 100 is powered on. Because at least one embodiment of the computing device 100 is capable of operating in a normal (e.g., CPU) operating mode 210 and a special-purpose (e.g., SMM) operating mode 200. FIG. 2 also illustrates instructions, routines, processes, or the like that occur in each of those modes.

The phases of operation of the computing device 100 include a firmware initialization or "BIOS" phase 212, an operating system booting phase 214, and an operating system running phase 216. The BIOS phase 212 and the O/S booting phase 214 may be referred to more generally as the "pre-boot" phase, while the O/S running phase 216 may be referred to as the "runtime" phase. The phases 212, 211, 216 generally occur one after the other; for example, the O/S booting phase 214 typically does not begin until the BIOS phase 212 is complete. Likewise, the O/S running phase 216 typically does not start until the O/S booting phase 214 is complete. The operating modes 200, 210 may run concurrently during any of the phases 212, 214, 216.

Figure 3:
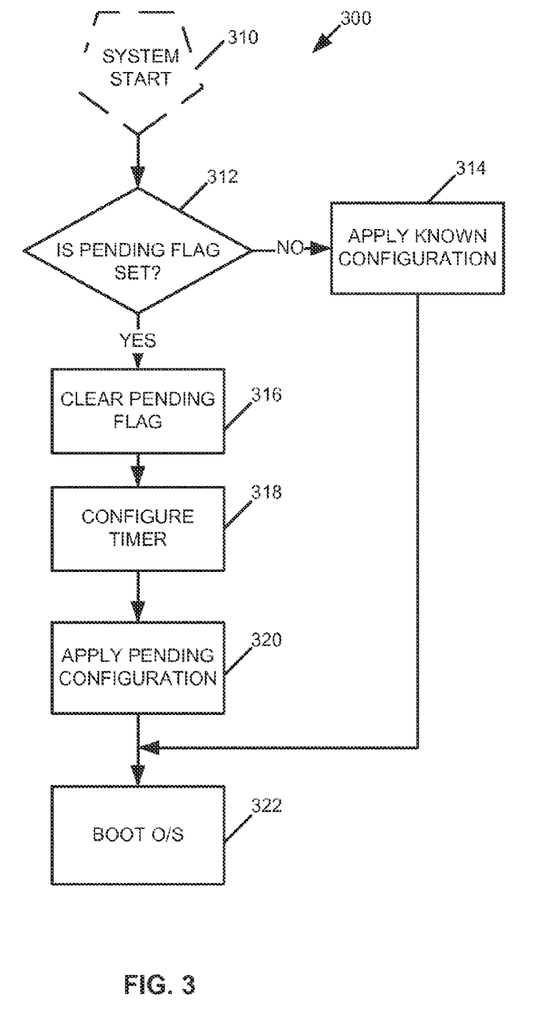
FIG. 3 is a simplified flow diagram of at least one embodiment of a method for determining which of at least two possible system configurations to apply during a pre-boot process.

During the BIOS phase 212, the computing device 100 executes computerized logic to accomplish the tasks identified by blocks 220 and 222. These tasks are accomplished in the normal operating mode 210. At block 220, the BIOS 132 and the SMM 200 are initialized. At block 222, the BIOS 132 executes early-boot logic configured to determine which system configuration to use when booting the operating system 128 (e.g., whether or not to boot with a known "good" configuration or to boot with a new or "pending" configuration that includes a system change). An illustrative method 300 for accomplishing the tasks of block 222 is shown in FIG. 3, described below. At block 221, the BIOS 132 loads and boots the operating system 128 with the configuration determined by the BIOS 132 at block 222. The computing device 100 is in the O/S booting phase 214 and in the normal operating mode 210 during the execution of computerized logic at block 224.

Figure 4:
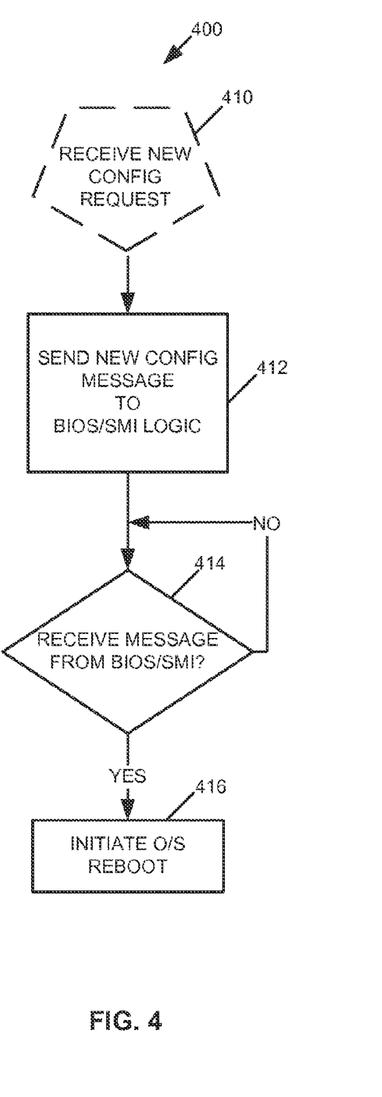
FIG. 4 is a simplified flow diagram of at east one embodiment of a method for initiating a system change.
Figure 5:
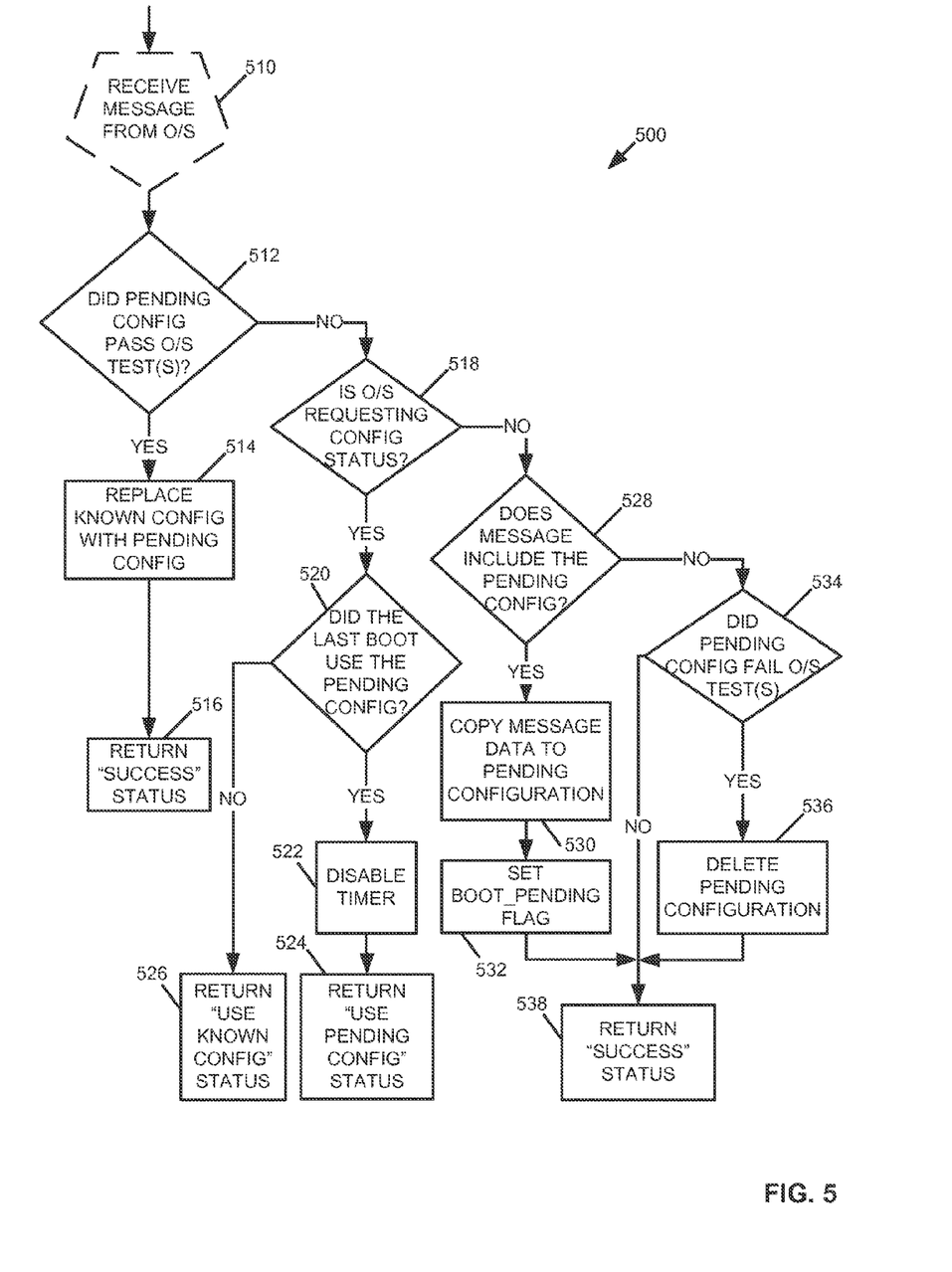
FIG. 5 is a simplified flow diagram of at least one embodiment of a method for handling communications relating to a pending system change.
Figure 6:
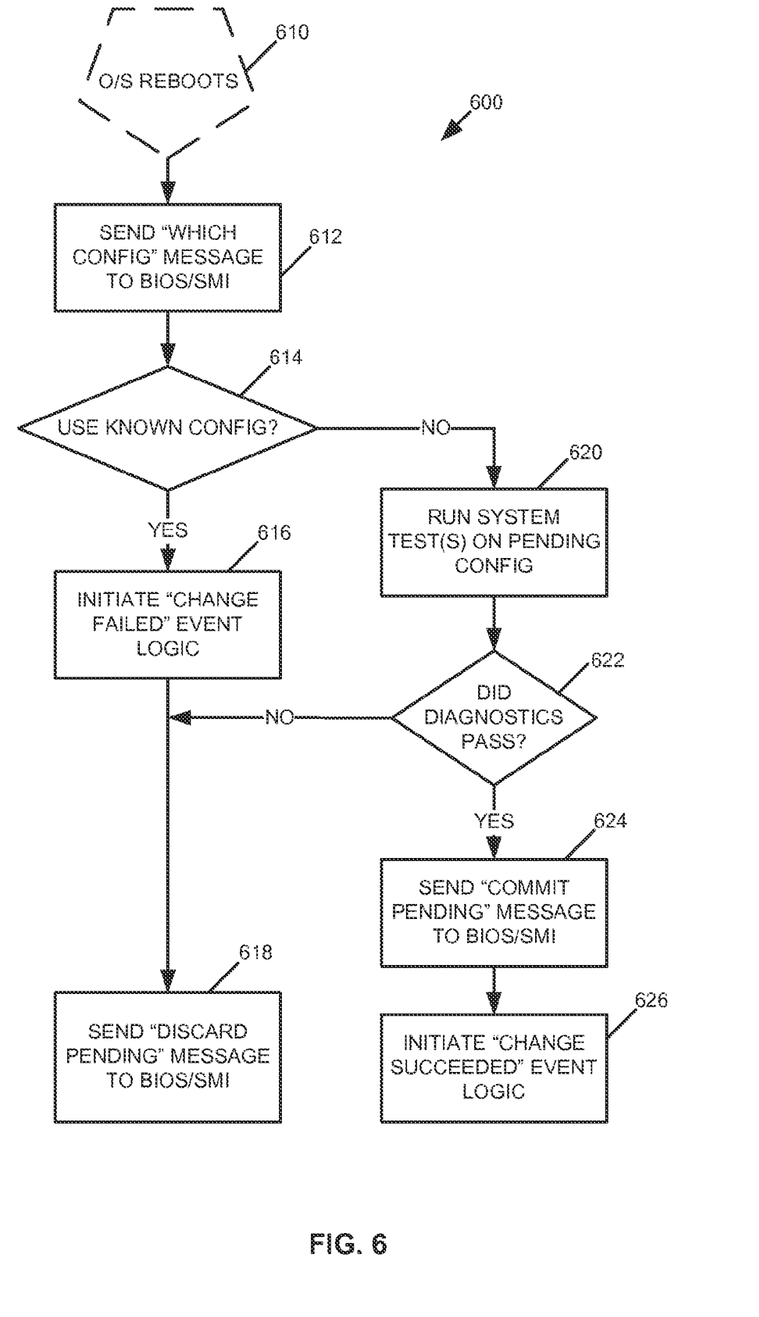
FIG. 6 is a simplified flow diagram of at least one embodiment of a method for verifying a pending system change.

Once the operating system 128 is booted or rebooted (e.g., step (1) or step (3) of FIG. 2), the computing device 100 operates in the O/S running phase 216 and the normal operating mode 210. As illustrated by block 226, the computing device 100 may run the software application(s) 136, interact with a user via one or more peripheral device(s) 124, and/or perform other activities or operations, during the O/S running phase 216. At any time during the O/S running phase 216, the O/S agent 230 may receive a request 228 for a system change as described above. The request 228 may originate with another process that is running on the computing device 100, or with a user of the computing device 100, for example. In response to the request 228, the O/S agent 130 initiates the implementation of the requested system change at step (2) of FIG. 2. An illustrative method 400 for accomplishing the task(s) of step (2) of FIG. 2 is shown in FIG. 4, described below. Using an SMI message, for example, the O/S agent 130 invokes the BIOS/SMI logic 134 to at least temporarily apply the requested system change. The BIOS/SMI logic 134 runs in the special purpose operating mode (e.g., SMM 200), as shown by block 232. An illustrative method 500 for accomplishing the task(s) of block 232 is shown in FIG. 5, described below. The O/S agent 130 then reboots the operating system 128 with the system change (step (3) of FIG. 2), and verifies the system change, e.g., by performing one or more system-level tests, at step (4) of FIG. 2. An illustrative method 600 for accomplishing the task(s) of step (4) of FIG. 2 is shown in FIG. 6, described below.

Referring now to FIG. 3, the illustrative method 300 for accomplishing the tasks of block 222 of FIG. 2 (e.g., to determine which configuration to use in booting the operating system 128) is shown. The method 300 may be embodied as computerized logic configured for execution by the BIOS 132 (e.g., as the BIOS early-boot logic 222). At block 310, the computing device 100 is powered on or otherwise started (or restarted). Block 310 is shown with dashed lines to indicate that, in the illustrative embodiments, block 310 is merely an event that occurs prior to the subsequent blocks (e.g., 312, 314, 316, 318, 320, 322) of the method 300 and need not be included in any computerized logic of the method 300.

At block 312, the BIOS early-boot logic 222 determines whether a "boot pending" flag has been set. In the illustrative embodiments, the boot pending flag is simply a bit that is turned on (e.g., assigned a value of "1") if a system change is pending (e.g., the O/S agent 130 has received a request to install a new configuration including a system change), or assigned a value of "0" if there is no system change waiting to be installed. In the illustrative embodiments, the boot pending flag is stored in BIOS storage (e.g., flash memory), if no system change is pending, then at block 314, the BIOS early-boot logic 222 applies the known "good" configuration (e.g., the system configuration existing prior to the system change).

If a system change is pending, then at block 316, the BIOS early-boot logic 222 clears the boot pending flag (e.g., changes the boot pending flag from a value of "1" to a value of "0," or vice versa). In the illustrative embodiments, the boot pending flag is used to ensure that only one attempt is made to boot the operating system 128 with the configuration containing the pending system change, unless the booting of the pending configuration completes successfully.

At block 318, the timer 122 is configured to countdown a period of time, so that when the period of time expires, the operating system 128 is automatically shut down and rebooted. In the illustrative embodiments, the period of time is set to allow the computing device 100 enough time to attempt a successful boot with the pending configuration before the time expires. The BIOS early-boot logic 222 then applies the pending configuration at block 320. At block 322, the BIOS early-boot logic 222 initiates booting of the operating system 128, using either the known configuration established at block 314 or the pending configuration applied at block 320, as the case may be. If the pending configuration is successful, the tasks of blocks 320 and 322 will have been successfully completed before the timer 122 expires. If the timer 122 expires before the tasks of blocks 320 and 322 have been completed, the pending configuration is considered to have failed.

Referring now to FIG. 4, the illustrative method 400 for accomplishing the task(s) of step (2) of FIG. 2 (e.g., to initiate booting of a pending configuration), is shown. The method 400 may be embodied as computerized logic configured for execution by the O/S agent 230. At block 410, the O/S agent 230 receives a request to apply (e.g., install) a pending system configuration that includes a system change (e.g., the request 228 illustrated in FIG. 2). The request may originate, for example, with another process or a user, as described above. Block 410 is depicted with dashed lines to indicate that, in the illustrative embodiments, block 410 is merely an event that occurs prior to the subsequent blocks (e.g., 412, 414, 416) of the method 400 and need not be included in any computerized logic of the method 400.

At block 412, the O/S agent sends a message (e.g., an SMI) to the BIOS/SMI runtime logic 232 that instructs the BIOS/SMI runtime logic 232 to upload the pending configuration included in the message. Further processing of the pending configuration is done by the BIOS/SMI runtime logic 232, in the special-purpose operating mode 200, beginning at block 528 of FIG. 5, described below. In the mean time, at block 414, the O/S agent 230 waits for a message from the BIOS/SMI runtime logic 232 indicating that it has completed the processing at blocks 528, 530, 532, 538 of FIG. 5. At block 416, the O/S agent 230 initiates the rebooting of the operating system 128 with the pending configuration that contains the system change (illustrated as step (3) of FIG. 2).

Referring now to FIG. 5, the illustrative method 500 for accomplishing the task(s) of block 232 is shown. The method 500 may be embodied as computerized logic configured for execution by the BIOS 132 (e.g., as the BIOS runtime logic 232). The illustrative method 500 is configured to receive a number of different messages (e.g., SMIs) from the O/S agent 230 during the processing of the pending configuration. In the illustrative embodiment, the method 500 is executed each time the BIOS/SMI runtime logic 232 receives a message from the OS agent 230.

At block 510, the BIOS/SMI runtime logic 232 receives a message (e.g., an SMI) from the O/S agent 230. In the illustrative embodiment, the message received at block 510 by the BIOS/SMI runtime logic 232 is generated by the O/S agent 230 at block 412 of FIG. 4, block 612 of FIG. 6, block 618 of FIG. 6, or block 624 of FIG. 6. Block 510 is depicted with dashed lines to indicate that, in the illustrative embodiments, block 510 is merely an event that occurs prior to the subsequent blocks (e.g., blocks 512, 518, 528, 534, and subsequent blocks) of the method 500 and need not be included in any computerized logic of the method 500. As shown in FIG. 2, the BIOS/SMI runtime logic 232 is executed using the special-purpose operating mode 200.

At block 512, the method 500 determines whether the message from the O/S agent 230 indicates that the pending configuration has been successfully applied and passed all applicable tests (e.g., a "commit pending" message). In the illustrative embodiment, the "commit pending" message is sent to the BIOS/SMI runtime logic 232 by the O/S agent 230 at block 624 of FIG. 6, described below. If the message received by the BIOS/SMI runtime logic 232 at block 512 is a "commit pending" message, then at block 514 the method 500 replaces the known "good" configuration with the pending configuration that includes a system change, and returns a status message indicating successful completion of that task to the O/S agent 230 at block 516. In the illustrative embodiment, the "success" message of block 516 is received by the O/S agent 230, and control is returned to the normal operating mode 210, at block 626 of FIG. 6, described below.

If the message from the O/S agent 230 is not a "commit pending" message, the method 500 proceeds to block 518. At block 518, the method 500 determines whether the message from the O/S agent 230 indicates that the O/S agent 230 is requesting information about the status of the current configuration; that is, whether the known "good" configuration or a pending configuration containing a system change is currently being used (e.g., a "which config" message). In the illustrative embodiments, the "which config" message is sent to the BIOS/SMI runtime logic 232 by the O/S agent 230 at block 612 of FIG. 6, described below.

If the message received by the BIOS/SMI runtime logic 232 at block 518 is a "which config" message, then at block 520 the method 500 determines whether the pending configuration was used the last time the operating system 128 was booted. In the illustrative embodiment, this is determined by reference to the boot pending flag, described above. If the last boot used the pending configuration, then at block 522, the timer 122 is disabled and a status message indicating that the pending configuration should be used is sent by the BIOS/SMI runtime logic 232 to the O/S agent 230 at block 524. The timer 122 is disabled at block 522 because, based on the boot pending flag, the MOS/SMI runtime logic 232 has concluded that the pending configuration was applied successfully. If the last boot did not use the pending configuration, then at block 526 a status message indicating that the known "good" configuration should be used is sent by the BIOS/SMI runtime logic 232 to the O/S agent 230. In the illustrative embodiments, the "use pending config" message of block 524 or the "use known config" message of block 526, as the case may be, is received by the O/S agent 230, and control is returned to the normal operating mode 210, at block 614 of FIG. 6, described below.

If the message from the O/S agent 230 is not a "which config" message, the method 500 proceeds to block 528. At block 528, the method 500 determines whether the message from the O/S agent 230 includes a pending configuration containing a system change (e.g., whether it is a "new config" message). In the illustrative embodiments, the "new config" message is sent to the BIOS/SMI runtime logic 232 by the O/S agent 230 at block 412 of FIG. 4, described above.

If the message received by the BIOS/SMI runtime logic 232 at block 528 is a "new config" message, then at block 530 the method 500 creates a pending configuration including the data contained in the "new config" message, sets the boot pending flag as described above at block 532, and sends a message to the O/S agent 230 indicating that the pending configuration has been successfully created at block 538. As noted above, block 528 is invoked whenever the O/S agent 230 receives a request for a system change 228. In the illustrative embodiments, the "success" message of block 538 is received by the O/S agent 230, and control is returned to the normal operating mode 210, at block 414 of FIG. 4, described above.

If the message from the O/S agent 230 is not a "new config" message, the method 500 proceeds to block 534 in at least some embodiments. At block 534, the method 500 determines whether the message from the O/S agent 230 indicates that the pending configuration did not pass all of the applicable tests and therefore should be discarded (e.g., whether it is a "discard pending" message). In the illustrative embodiments, the "discard pending" message is sent to the BIOS/SMI runtime logic 232 by the O/S agent 230 at block 618 of FIG. 6, described below.

If the message received by the BIOS/SMI runtime logic 232 at block 534 is a "discard pending" message, then at block 536 the method 500 deletes the pending configuration and sends a status message to the O/S agent 230 indicating that the pending configuration was successfully deleted. As mentioned above, the method 500 is executed in the special-purpose operating mode 200 and control is returned to the normal CPU operating mode 210 at blocks 516, 524, 526, 528, and 536 of FIG. 5.

Referring now to FIG. 6, the illustrative method 600 for accomplishing the task(s) of step (4) of FIG. 2 (e.g., to verify successful installation of a pending configuration) is shown. The method 600 may be embodied as computerized logic configured for execution by the O/S agent 230. The method 600 is invoked once the operating system 128 has been rebooted with the pending configuration at block 416 of FIG. 4. Accordingly, block 610 is depicted with dashed lines to indicate that, in the illustrative embodiments, block 610 is merely an event that occurs prior to the subsequent blocks (e.g., block 612 and subsequent blocks) of the method 600 and need not be included in any computerized logic of the method 600.

At block 612, the O/S agent 230 sends the "which config" message described above to the BIOS/SMI runtime logic 232, to determine whether the known "good" configuration or the pending configuration is in use. At block 614, the O/S agent 230 receives the message generated by the BIOS/SMI runtime logic 232 at either block 524 or block 526 of FIG. 5, described above. If the message received by the O/S agent 230 from the BIOS/SMI runtime logic 232 at block 614 indicates that the known "good" configuration is in use, then the O/S agent 230 can conclude that the one-time trial boot with the pending configuration was not successful (e.g., the timer 122 expired before the boot was complete and therefore initiated a reboot with the known "good" configuration, or a user pressed a power or reset button). In such event, the O/S agent 230 initiates computerized error handling logic in response to the failed attempt, at block 616, and, in at least some embodiments, sends the "discard pending" message described above to the BIOS/SMI runtime logic 232, at block 618. Some examples of error handling logic may include keeping a log of the failed attempt to boot the pending configuration and/or other data relating thereto, creating a report relating to one or more such failed attempts, sending one or more alerts to user(s) of the computing device 100, an output device (such as a display or speaker), a network, or a remote computing device, and/or other remedial measures. The remedial measure or measures conducted by the O/S agent 230 at block 616 may vary according to the requirements of a particular system design or configuration of the computing device 100.

If the message received by the O/S agent 230 from the BIOS/SMI runtime logic 232 at block 614 indicates that the pending configuration is in use, then the O/S agent 230 can conclude that the boot with the pending configuration was successful, and can proceed to block 620. However, even if the boot of the pending configuration completed successfully, there may still be a risk that the system has an instability or other operational issue. Therefore, at block 620, the O/S agent 230 conducts one or more diagnostics, system tests, operating system tests, built-in self-tests (BISTs), and/or other functional tests or series of tests, to determine whether the computing device 100 is operating properly after booting with the pending configuration. The test or tests conducted by the O/S agent 230 at block 620 may vary according to the requirements of a particular system design or configuration of the computing device 100.

If the pending configuration successfully completes the one or more tests and/or diagnostics conducted by the O/S agent 230 at block 620, then at block 624, the O/S agent 230 sends the "commit pending" message described above to the BIOS/SMI runtime logic 232, instructing the BIOS/SMI runtime logic 232 to replace the known "good" configuration with the pending configuration. At block 626, the O/S agent 230 receives the "success" status message generated by the BIOS/SMI runtime logic 232 at block 516 of FIG. 5, and initiates event logic relating to the successful implementation of the pending configuration. Some examples of such event logic may include logging the successful attempt to boot the pending configuration and/or other data relating thereto, creating a report relating to one or more such successful attempts, sending one or more alerts to one or more user(s) of the computing device 100, an output device (such as a display or speaker), a network, or a remote computing device, and/or other event reporting measures. The event reporting measure or measures conducted by the O/S agent 230 at block 626 may vary according to the requirements of a particular system design or configuration of the computing device 100.

If the pending configuration does not complete the one or more tests and/or diagnostics conducted by the O/S agent 230 at block 620, then at block 618, the O/S agent 230 sends the "discard pending" message described above to the BIOS/SMI runtime logic 232, to instruct the BIOS/SMI runtime logic 232 to delete the pending configuration and maintain the known "good" configuration. In various embodiments, the O/S agent 230 may use any criteria or number of criteria to determine whether to accept the pending configuration, based on the requirements of a particular system design or configuration of the computing device 100. For example, in some embodiments, passing less than 100% of all of the conducted tests and/or diagnostics may be considered "passing," while in other embodiments, passing all of the conducted tests and/or diagnostics may be required.

EXAMPLES

Illustrative examples of the devices, systems, and methods disclosed herein are provided below. An embodiment of the devices, systems, and methods may include any one or more, and any combination of, the examples described below.

In one example, a computing device configured to implement a system-level change may include at least one processor core and a memory device coupled to the at least one processor core, the memory device having stored therein a plurality of instructions that when executed by the at least one processor core, cause the at least one processor core to, while an operating system and a BIOS are running on the computing device, initiate, by the operating system sending a message to the BIOS, a system change. In an example, the at least, one processor may start, by the BIOS, a timer configured to reboot the operating system after expiration of a period of time. In an example, the at least one processor may boot the operating system with the system change. In an example, the at least one processor may determine, by the operating system communicating with the BIOS, whether the boot with the system change is successful, in an example, the at least one processor may process, by the BIOS, the system change, in response to determining whether the system change is successful. In an example, the operating system may be configured to receive a request for a system change. In an example, the BIOS may be configured to set a flag indicating that the system change is pending. In an example, the BIOS may be configured to determine whether the flag is set and boot, the operating system with the system change in response to the flag being set. In an example, the BIOS may be configured to determine whether the flag is set and boot the operating system without the system change in response to the flag not being set. In an example, the BIOS may be configured to disable the timer in response to determining that the boot with the system change is successful. In an example, the computing device may be configured to reboot the operating system in response to expiration of the period of time. In an example, the operating system may be configured to execute at least one test configured to verify proper operation of the computing device in response to booting the operating system with the system change. In an example, the operating system may be configured to send a message to the BIOS, indicating whether the system change is successful. In an example, the operating system and the BIOS may be running in a first configuration on the computing device, and the BIOS may be configured to replace the first configuration with a second configuration including the system change in response to the operating system determining that the system change is successful. In an example, the operating system and the BIOS may be running in a first configuration on the computing device, and the BIOS may be configured to delete the system change and maintain the first configuration in response to the operating system determining that the system change is not successful. In an example, the operating system may be configured to report, to at least one of a user, an output device, a network, and a remote computing device, a status of the system change in response to determining whether the system change is successful.

In another example, a method may include, at a computing device running an operating system and a BIOS in communication with the operating system, initiating, by the operating system, a system change to the computing device while the operating system is running on the computing device. In an example, the method may include the BIOS at least temporarily applying the system change. In an example, the method may include the operating system determining whether the system change is successful. In an example, the method may include the BIOS processing the system change in response to determining whether the system change is successful. In an example, the method may include the BIOS configuring a timer to allow the operating system to attempt a boot with the system change and to reboot without the system change in response to determining that the system change is unsuccessful. In an example, the method may include the operating system performing at least one diagnostic in response to at least temporarily applying the system change.

In another example, a computing device may include at least one processor; and computer circuitry coupled to the at least one processor, the computer circuitry being arranged to cause the at least one processor to perform any of the foregoing methods. In another example, at least one computer accessible medium may include a plurality of instructions that in response to being executed result in a computing device performing any of the foregoing methods.

In another example, a method for implementing a system change may include, while an operating system and a BIOS are running on a computing device, the BIOS receiving, from the operating system, a request to make a system change to the computing device. The method may include the BIOS initiating booting of the operating system with the requested system change. The method may include the BIOS receiving, from the operating system, an indication of whether the system change is successful. The method may include processing the system change in response to the indication of whether the system change is successful.

In an example, a computing device configured to implement a system change may include at, least one processor; and computer circuitry coupled to the at least one processor, where the computer circuitry may be arranged to cause the at least one processor to perform the foregoing method. In an example, at least one computer accessible medium may include a plurality of instructions that in response to being executed result in a computing device performing the foregoing method.

In another example, a method for implementing a system change may include, while an operating system and a BIOS are running on a computing device, the operating system receiving, from the BIOS, a message indicating which of a first configuration of the operating system and a second configuration of the operating system comprising a system change is running. The method may include performing at least one test to determine whether the computing device is operating properly in response to a message from the BIOS indicating that the second configuration is running. The method may include sending a message to the BIOS indicating whether the computing device is operating properly with the second configuration.

In another example, a computing device configured to implement a system change may include at least one processor; and computer circuitry coupled to the at least one processor, where the computer circuitry may be arranged to cause the at least one processor to perform the foregoing method. In another example, at least one computer accessible medium configured to implement a system change may include a plurality of instructions that in response to being executed result in a computing device performing the foregoing method.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected. Further, while aspects of the present disclosure have been described in the context of a computing device, it will be understood that the various aspects have other applications, for example, any application in which it is desired to automatically initiate a system-level change or update. Such applications may include, for example, any device having one or more computer-controlled features, such as personal electronic devices, "smart" appliances and/or other products.

The invention claimed is:

1. A computing device configured to implement a system change, comprising:
   at least one processor core; and
   a memory device coupled to the at least one processor core, the memory device having stored therein a plurality of instructions that when executed by the at least one processor core, cause the at least one processor core to:
   while an operating system and a BIOS are running on the computing device, initiate, by the operating system sending a message to the BIOS, a system change;
   set, by the BIOS, a flag indicating that the system change is pending;
   start, by the BIOS and while the operating system is running on the computing device, a timer configured to reboot the operating system after expiration of a period of time;
   boot the operating system with the system change;
   determine, by the operating system communicating with the BIOS, whether the boot with the system change is successful based on whether the boot with the system change occurred within the period of time; and
   process, by the BIOS, the system change, in response to determining whether the system change is successful.

2. The computing device of claim 1, configured to receive, by the operating system, a request for a system change.

3. The computing device of claim 1, configured to determine, by the BIOS, whether the flag is set and boot the operating system with the system change in response to the flag being set.

4. The computing device of claim 1, configured to determine, by the BIOS, whether the flag is set and boot the operating system without the system change in response to the flag not being set.

5. The computing device of claim 1, configured to disable, by the BIOS, the timer in response to determining that the boot with the system change is successful.

6. The computing device of claim 1, configured to reboot the operating system in response to expiration of the period of time.

7. The computing device of claim 1, configured to execute, by the operating system, at least one test configured to verify proper operation of the computing device in response to booting the operating system with the system change.

8. The computing device of claim 1, configured to send, by the operating system, a message to the BIOS, indicating whether the system change is successful.

9. The computing device of claim 1, wherein the operating system and the BIOS are running in a first configuration on the computing device, the computing device configured to, by the BIOS, replace the first configuration with a second configuration including the system change in response to the operating system determining that the system change is successful.

10. The computing device of claim 1, wherein the operating system and the BIOS are running in a first configuration on the computing device, and the computing device is configured to, by the BIOS, delete the system change and maintain the first configuration in response to the operating system determining that the system change is not successful.

11. The computing device of claim 1, configured to, by the operating system, report, to a user, an output device, a network, or a remote computing device, a status of the system change in response to determining whether the system change is successful.

12. A method for implementing a system change, comprising:
   on a computing device running an operating system and a BIOS in communication with the operating system:
   initiating, by the operating system, a system change to the computing device while the operating system is running on the computing device;
   setting, by the BIOS, a flag indicating that the system change is pending;
   starting, by the BIOS and while the operating system is running on the computing device, a timer configured to reboot the operating system after expiration of a period of time;
   at least temporarily applying, by the BIOS, the system change;
   determining, by the operating system, whether the system change is successful based on whether the boot with the system change occurred within the period of time; and
   processing, by the BIOS, the system change in response to determining whether the system change is successful.

13. The method of claim 12, wherein the timer is further to allow the operating system to reboot without the system change in response to determining that the system change is unsuccessful.

14. The method of claim 12, comprising performing, by the operating system, at least one diagnostic in response to at least temporarily applying the system change.

15. A computing device configured to implement a system change, comprising:
at least one processor; and
computer circuitry coupled to the at least one processor, the computer circuitry being arranged to cause the at least one processor to perform the method of claim 12.

16. At least one non-transitory computer accessible medium comprising a plurality of instructions that in response to being executed cause a computing device to:
while an operating system and a BIOS are running on the computing device, with the BIOS:
receive, from the operating system, a request to make a system change to the computing device;
set a flag indicating that the requested system change is pending;
start a timer configured to reboot the operating system after expiration of a period of time;
initiate booting of the operating system with the requested system change;
receive, from the operating system, an indication of whether the system change is successful based on whether the boot with the system change occurred within the period of time; and
process the system change in response to the indication of whether the system change is successful.

17. A computing device configured to implement a system change, comprising:
at least one processor; and
computer circuitry coupled to the at least one processor, the computer circuitry being arranged to cause the at least one processor to execute the instructions of claim 16.

18. At least one non-transitory computer accessible medium comprising a plurality of instructions that in response to being executed cause a computing device to:
while an operating system and a BIOS are running on the computing device, initiate, by the operating system sending a message to the BIOS, a system change;
set, by the BIOS, a flag indicating that the system change is pending;
start, by the BIOS and while the operating system is running on the computing device, a timer configured to reboot the operating system after expiration of a period of time;
boot the operating system with the system change;
determine, by the operating system communicating with the BIOS, whether the boot with the system change is successful based on whether the boot with the system change occurred within the period of time;
process, by the BIOS, the system change, in response to a determination that the system change is successful;
receive, by an operating system agent of the computing device and from the BIOS, a message indicating which of a first configuration of the operating system and a second configuration of the operating system comprising the system change is running;
perform at least one test to determine whether the computing device is operating properly in response to a message from the BIOS indicating that the second configuration is running; and
send a message to the BIOS indicating whether the computing device is operating properly with the second configuration.

19. A computing device configured to implement a system change, comprising:
at least one processor; and
computer circuitry coupled to the at least one processor, the computer circuitry being arranged to cause the at least one processor to execute the instructions of claim 18.

* * * * *